(12) United States Patent
Kawai

(10) Patent No.: US 7,188,393 B2
(45) Date of Patent: Mar. 13, 2007

(54) FASTENER DEVICE

(75) Inventor: Yasuhiro Kawai, Toyohashi (JP)

(73) Assignee: Newfrey LLC, Newark, DE (US)

( * ) Notice: Subject to any disclaimer, the term of this patent is extended or adjusted under 35 U.S.C. 154(b) by 20 days.

(21) Appl. No.: 11/206,039

(22) Filed: Aug. 18, 2005

(65) Prior Publication Data

US 2006/0042053 A1  Mar. 2, 2006

(30) Foreign Application Priority Data

Aug. 26, 2004 (JP) ............... 2004-247058

(51) Int. Cl.
*E04F 19/02* (2006.01)
*F16B 13/00* (2006.01)
*F16B 5/00* (2006.01)
*B60R 13/02* (2006.01)

(52) U.S. Cl. ............... 24/297; 24/458; 24/453; 411/48; 411/508; 411/512

(58) Field of Classification Search ............ 24/458, 24/453, DIG. 37, 581.11, 573.09, 291, 292, 24/297; 411/508, 512, 48; 403/408.1
See application file for complete search history.

(56) References Cited

U.S. PATENT DOCUMENTS 4,865,505 A * 9/1989 Okada ............... 411/512
5,106,225 A * 4/1992 Andre et al. ............ 403/408.1
6,048,147 A * 4/2000 Arisaka et al. ............ 411/48
6,264,393 B1 * 7/2001 Kraus ............... 24/297
6,560,819 B2 * 5/2003 Mizuno et al. ............ 411/508

FOREIGN PATENT DOCUMENTS

| JP | 1-165811 | 11/1989 |
|----|----------|---------|
| JP | 5-223114 | 8/1993 |
| JP | 9-280227 | 10/1997 |

* cited by examiner

*Primary Examiner*—Robert J. Sandy
(74) *Attorney, Agent, or Firm*—Miles & Stockbridge P.C.

(57) ABSTRACT

A fastener device for connecting a first component to a second component comprises a clip having a flange and a shank, and a retaining plate cooperable with the clip to embrace the first component between the flange and the retaining plate when the shank is passed through a hole in the first component and a hole in the retaining plate. When the shank is passed through a hole in the second component, first elastic engagement leaves on the shank engage an edge of that hole. Second elastic engagement leaves on the retaining plate engage portions of the first elastic engagement leaves, and the retaining plate is interposed between the components.

5 Claims, 8 Drawing Sheets

FASTENER DEVICE

CROSS-REFERENCE TO RELATED APPLICATION

This application claims the benefit of Japanese Application 2004-247058 filed Aug. 26, 2004, incorporated herein by reference.

BACKGROUND OF THE INVENTION

The present invention relates to a fastener device for fastening a first component to a second component, such as a fastener device for fastening a body panel to a vehicle.

A clip for fastening a first component such as a car part to a second component such as a car body has been disclosed in Unexamined Japanese Utility Model Application Publication No. 1-165811 (Patent Document 1). The clip comprises a flange, and a shank with elastic engagement leaves are formed thereon. A connecting plate for connecting the first component is formed on the flange; the clip is attached to the first component; and the shank is inserted into a through-hole in the second component to attach the clip to the second component. In this way, the clip is able to fasten the first component to the second component. Release arms extending from the shank beyond the flange are integrated with the elastic engagement leaves, and can be bent using a finger to detach the clip from the second component and release the first component from the second component.

A fastener device for fastening a first component such as a switch to a second component such as a panel has been disclosed in Unexamined Japanese Patent Application Publication No. 5-223114 (Patent Document 2). A hollow box is formed in the fastener device for housing a first component such as a switch, and elastic engagement leaves are formed on the sides of the box. The fastener device housing the first component is inserted into a mounting hole in the second component so that the elastic engagement leaves engage an edge of the mounting hole, and the first component is fastened to the second component. A cord is installed where the elastic engagement leaves engage. When the cord is pulled, the elastic engagement leaves bend inward and disengage from the edge of the mounting hole in the second component, allowing the fastener device housing the first component to be released from the second component.

A clip for fastening first components such as cords to a second component such as a panel has been disclosed in Unexamined Japanese Patent Application Publication No. 9-280227 (Patent Document 3). The clip has a bundling arm to hold a plurality of first components such as cords in a bundle, and engagement legs depending from the arm. The first components are held by the bundling arm. When the engagement legs are inserted into a mounting hole in the second component and the elastic engagement portions of the engagement legs engage an edge of the mounting hole, the clip is attached to the second component and, in this way, the first components are fastened to the second component. A disengagement arm extends from the bundling arm in the elastic engagement portions of the engagement legs to bend the elastic engagement portions inward from opposite sides. When pressure is applied to the disengagement arm using a finger, the elastic engagement portions become disengaged from the edge of the mounting hole in the second component, and the first component and the clip can be detached from the second component.

The clip in Patent Document 1, the fastener device in Patent Document 2, and the clip in Patent Document 3 are all configured to allow components to be detached. The clip in Patent Document 1 has release arms on the shank extending from the elastic engagement leaves beyond the flange in order to allow components to be detached. However, the release arms protrude on the upper surface of the flange in a difficult mounting position. Also, the upper surface of the flange is not flat and, thus, cannot be used to attach other components. In the fastener device in Patent Document 2, a cord is installed where the elastic engagement leaves engage to allow components to be detached. However, the cord has to operate within a narrow space and components cannot be detached if the cord becomes severed or is lost.

In the clip in Patent Document 3, a release arm extends from the bundling arm to bend the elastic engagement portions of the shank inward and detach components. In this document, a release arm is used to detach components, not an inconvenient cord as in Patent Document 2. Also, because the release arm extends toward the elastic engagement portion of the shank and not toward other components, it does not have the disadvantages of Patent Document 1. However, a finger or a tool such as longnose pliers has to be used to apply, pressure to the release arm. It is difficult to insert a finger or longnose pliers due to the panel-shape of the second component, and the release operation is difficult to perform in a dark place where visibility is low.

BRIEF DESCRIPTION OF THE INVENTION

An object of the present invention is to provide an improved fastener device in which a first component can be easily attached to and detached from a second component.

In a non-limiting embodiment of the present invention, a fastener device comprises a clip having a flange and a hollow shank, with first elastic engagement leaves formed on sides of the shank extending outward radially, and a retaining plate engaging the first elastic engagement leaves and working with the flange to hold a first component between the flange and the retaining plate. The shank is inserted into a through-hole in a second component, and the first elastic engagement leaves engage an edge of the through-hole, with the retaining plate interposed between the first component and the second component. Second elastic engagement leaves are formed on the retaining plate so as to extend inward and engage engagement receiving portions of the first elastic engagement leaves. If an external force is applied to move the retaining plate and the flange away from one another, the second elastic engagement leaves move the first elastic engagement leaves toward the inside of the shank to disengage the first elastic engagement leaves from the edge of the through-hole in the second component.

More particularly, with the first component held between the clip flange and the retaining plate, the first component can be attached to the second component by simply inserting the clip shank into a mounting hole in the second component. If the components are to be detached from one another, the tip of longnose pliers or a screwdriver is simply inserted between the clip flange and the first component and external force is applied to separate the retaining plate from the flange and remove the clip shank from the second component. Because the tip of a tool is simply inserted between the flange and the first component during the release operation, the operation is easy to perform even in a somewhat dark place. Because there are no leaves formed on the clip flange to assist in the release operation, the upper surface of the flange is smooth and can be used to attach another component.

In a preferred embodiment of the fastener device, the first elastic engagement leaves are integral with the shank; the second elastic engagement leaves are disposed so as to correspond to the first elastic engagement leaves; and engagement receiving portions of the first elastic engagement leaves receive the tips of the corresponding second elastic engagement leaves. The engagement receiving portions are formed in the shape of a recess, a shoulder or an abutment. Also, the second elastic engagement leaves extend from the retaining plate so that the first elastic engagement leaves do not bend inward with respect to the shank when the retaining plate and the flange are arranged within a predetermined interval. Furthermore, the retaining plate is configured so that if external force is applied to increase the interval with the flange beyond the predetermined interval, the second elastic engagement leaves move along a direction perpendicular to the axis of the shank, so that the engagement receiving portions of the first elastic engagement leaves engaging the tips of the second elastic engagement leaves move inward with respect to the shank. Moreover, third engagement leaves are formed on the retaining plate and disposed to engage the second component at a side opposite to the first elastic engagement leaves.

In another preferred embodiment of the fastener device, a bore is formed in both the flange and the shank of the clip. A pin comprising a pin flange and pin shank is provided for insertion into the bore to keep the first engagement leaves from bending inward with respect to the shank. The pin is configured so as to be detachable from the clip.

BRIEF DESCRIPTION OF THE DRAWINGS

The present invention will be further described in conjunction with the accompanying drawings illustrating preferred (best mode) embodiments, and wherein.

DETAILED DESCRIPTION OF THE INVENTION

Figure 6:
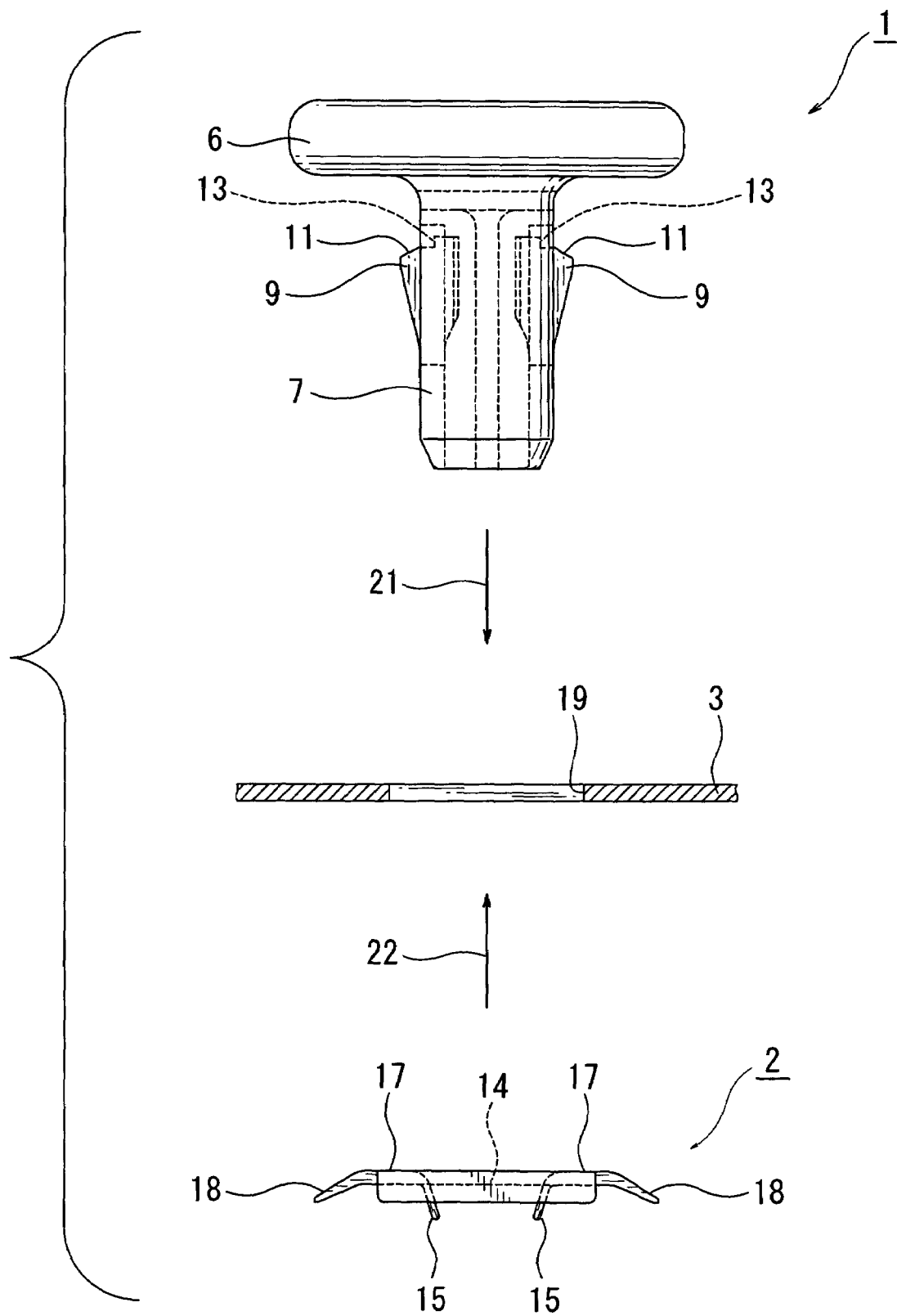
FIG. 6 is a diagram of an assembly operation using the clip and retaining plate of the fastener device of the first example of the present invention for holding a first component.
Figure 7:
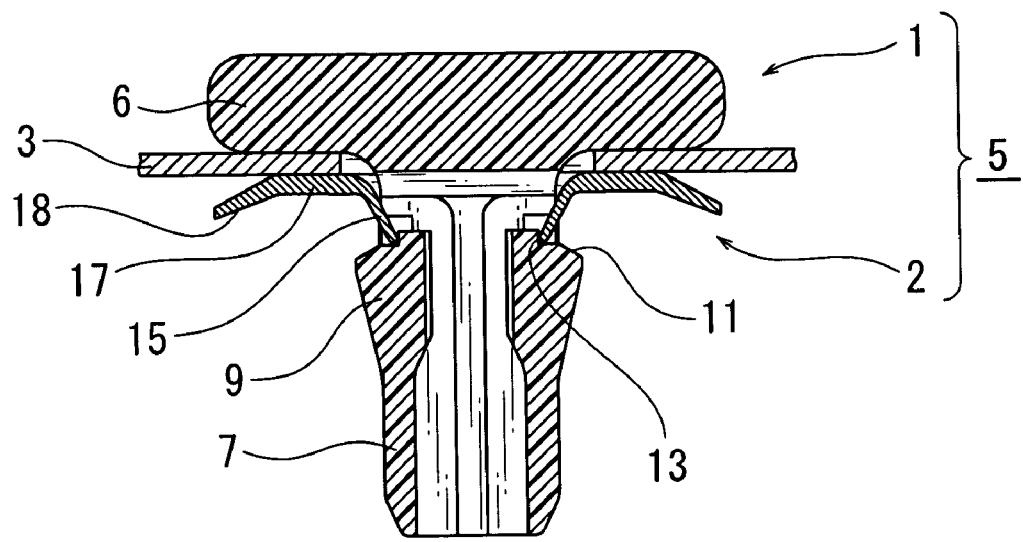
FIG. 7 is a cross-sectional view of the fastener device showing the assembly after the operation in FIG. 6 has been performed.

The following is a detailed explanation of examples of the present invention with reference to the drawings. The fastener device 5 comprises the clip 1 in FIG. 1 through FIG. 3 and the retaining plate 2 in FIG. 4 and FIG. 5. As shown in FIG. 6, the clip 1 and the retaining plate 2 are about to engage a first component 3 from opposite sides to hold it in place. In FIG. 7, the fastener device 5 comprising the clip 1 and the retaining plate 2 are shown holding the first component 3.

Figure 1:
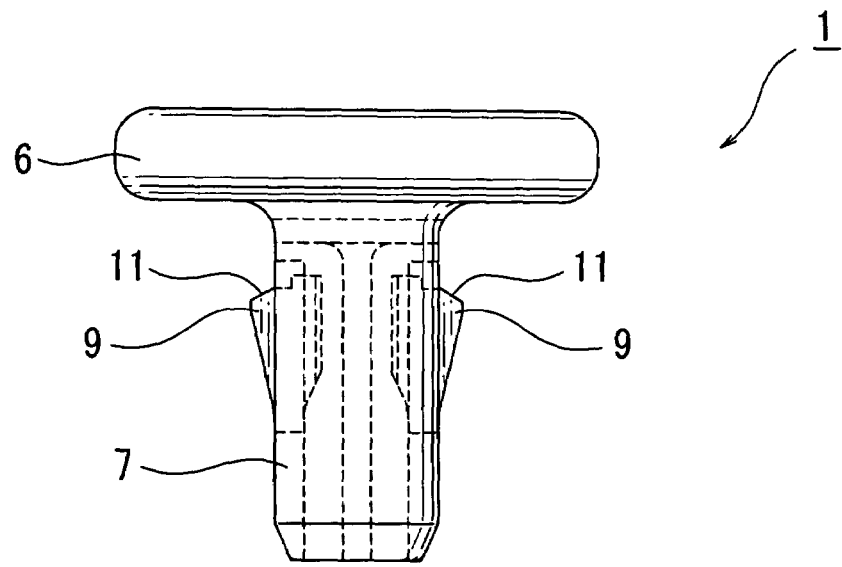
FIG. 1 is a front view of a clip of a fastener device in a first example of the present invention.
Figure 2:
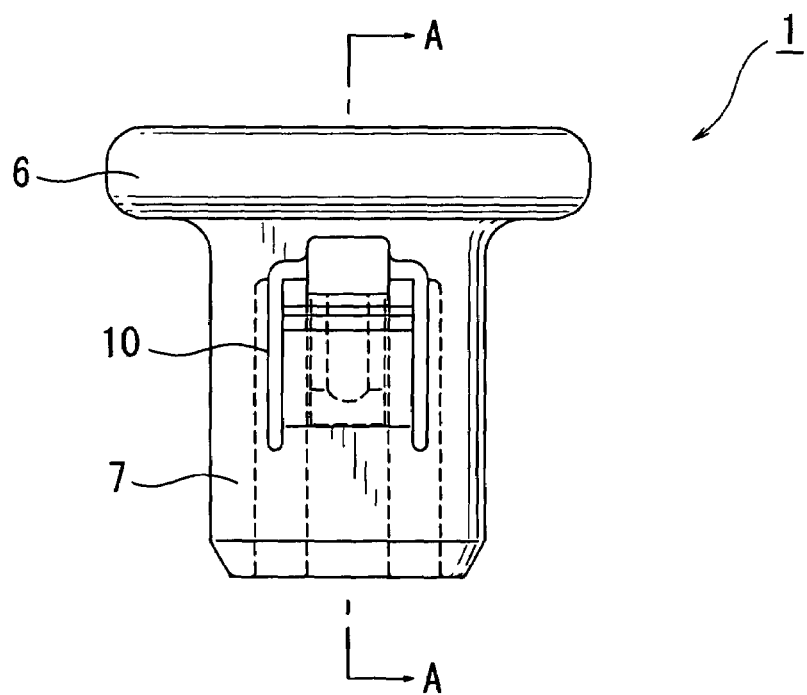
FIG. 2 is a side view of the clip in FIG. 1.
Figure 3:
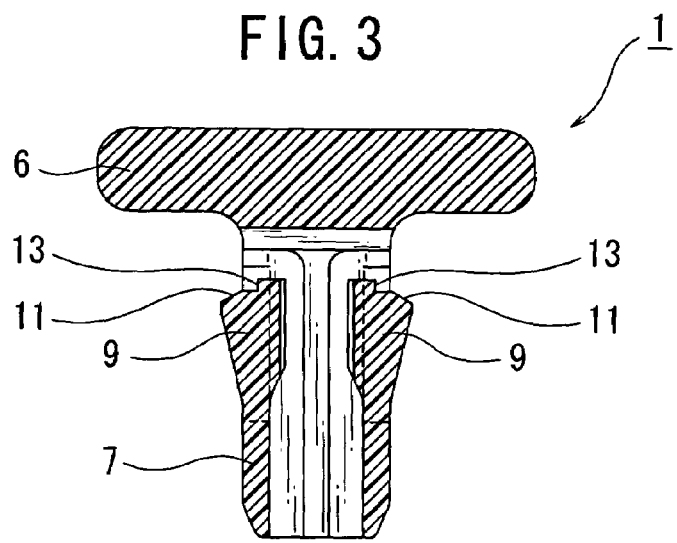
FIG. 3 is a cross-sectional view of the clip from line A—A in FIG. 2.

The clip 1 will now be explained with reference to FIG. 1 through FIG. 3. The clip 1 is preferably integrally molded from hard plastic. However, it can also be made from another appropriate material. The clip 1 comprises a large-diameter flange 6 and a small-diameter shank 7 depending from the flange. The flange can be formed, for example, in the shape of a round plate. The shank 7 is hollow and can have a horizontal cross-section that is round. In this example, however, the horizontal cross-section is rectangular. A pair of first elastic engagement leaves 9, 9 extend outward from opposite sides of the shank 7. As shown in FIG. 2, an inverted U-shaped slit 10 is formed at opposite sides of the main body of the shank 7 to allow the first elastic engagement leaves 9 to move elastically on the sides of the shank 7. A shoulder 11 for engaging an edge of a mounting hole in a second component is formed at a tip (the upper tip in FIG. 3) of each of the first elastic engagement leaves 9. An engagement receiving portion 13 is formed beside each shoulder 11 to receive and engage second elastic engagement leaves 15 (described below) in a receiving plate 2. The engagement receiving portions 13 may have recesses formed near the shoulders 11, or indentations may be formed adjacent to the shoulders 11 using ribs or protrusions.

Figure 4:
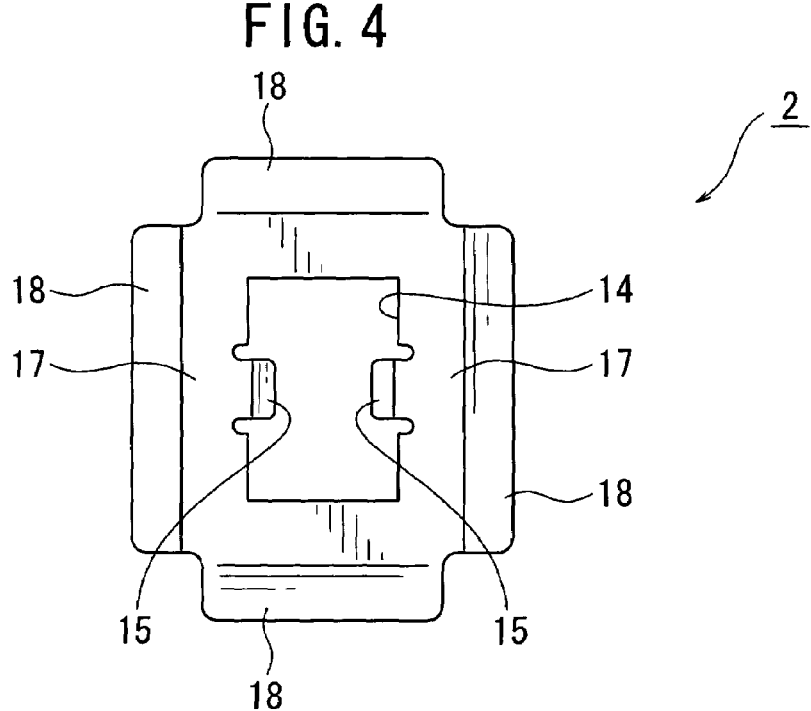
FIG. 4 is a plan view of a retaining plate in the first example of the present invention.
Figure 5:
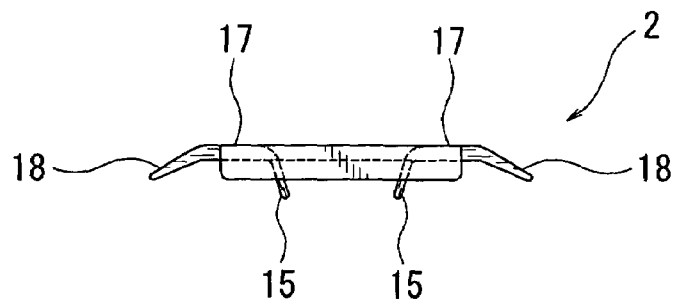
FIG. 5 is a front view of the retaining plate in FIG. 4.

The following is an explanation of the retaining plate 2 with reference to FIG. 4 and FIG. 5. The retaining plate 2 is preferably integrally molded from hard plastic. However, it can also be made from another material such as metal. As shown in FIG. 4, the retaining plate 2 in this example is rectangular. However, it can have another shape such as a round shape. A through-hole 14 is formed in the center of the retaining plate for the shank 7 in the clip 1 to pass through. In this example the through-hole 14 is a rectangular hole matching the horizontal cross-sectional shape of the shank 7. The hole 14 should be slightly larger than the horizontal cross-sectional shape of the shank 7 so that the shank 7 can be easily inserted. A pair of second elastic engagement leaves 15 are formed on opposite edges of the through-hole 14 in the retaining plate 2 at positions corresponding to the first elastic engagement leaves 9 on the clip 1, so as to extend inward with respect to the through-hole 14. The tips of the second elastic engagement leaves 15 engage the engagement receiving portions 13 on the first elastic engagement leaves 9. The second elastic engagement leaves 15 are formed, as shown in FIG. 5, so as to depend nearly at a right angle with respect to the flat surface of the retaining plate 2. When positioned in this manner, the second elastic engagement leaves 15 can be accommodated by the engagement receiving portions 13 in the first elastic engagement leaves 9 without applying pressure to the elastic engagement leaves 9.

Third elastic engagement leaves 18 are preferably formed on all four sides of the retaining plate 2. The third elastic engagement leaves 18 are instrumental in maintaining a flat surface portion 17 of the retaining plate 2 in a desired position with respect to connected first and second components and in preventing the first elastic engagement leaves 9 from moving inward with respect to the shank 7 until a release force is applied (as later described). The third elastic engagement leaves 18 also allow the retaining plate 2 and the clip 1 to be stably mounted irrespective of the plate thickness of the second component.

The fastener device 5 holds a first component 3 using the clip 1 and retaining plate 2. FIG. 6 shows the procedure for holding this component. First, the shank 7 of the clip 1 is inserted into a mounting hole 19 in the first component 3 (arrow 21). Next, the retaining plate 2 is pushed onto the shank 7 extending from the first component 3 so that the shank 7 is received in the through-hole 14 (arrow 22). This operation, as shown in FIG. 7, interposes the first component 3 between the flange 6 of the clip 1 and the flat surface portion 17 of the retaining plate 2 and holds it in place. The interval between the flange 6 on the clip 1 and the flat surface portion 17 of the retaining plate 2 is preferably as small as possible while still allowing the first component 3 to be interposed between them. In this position, the tips of the second elastic engagement leaves 15 on the retaining plate 2 are accommodated and just engaged by the engagement receiving portions 13 at the tips of the first elastic engagement leaves 9 on the shank 7 of the clip, and the second elastic engagement leaves 15 are not moved inward with respect to the shank. The fastener device 5 comprising clip 1 and the retaining plate 2 can be attached beforehand to the first component 3, as shown in FIG. 7, and stored with a second component.

Figure 8:
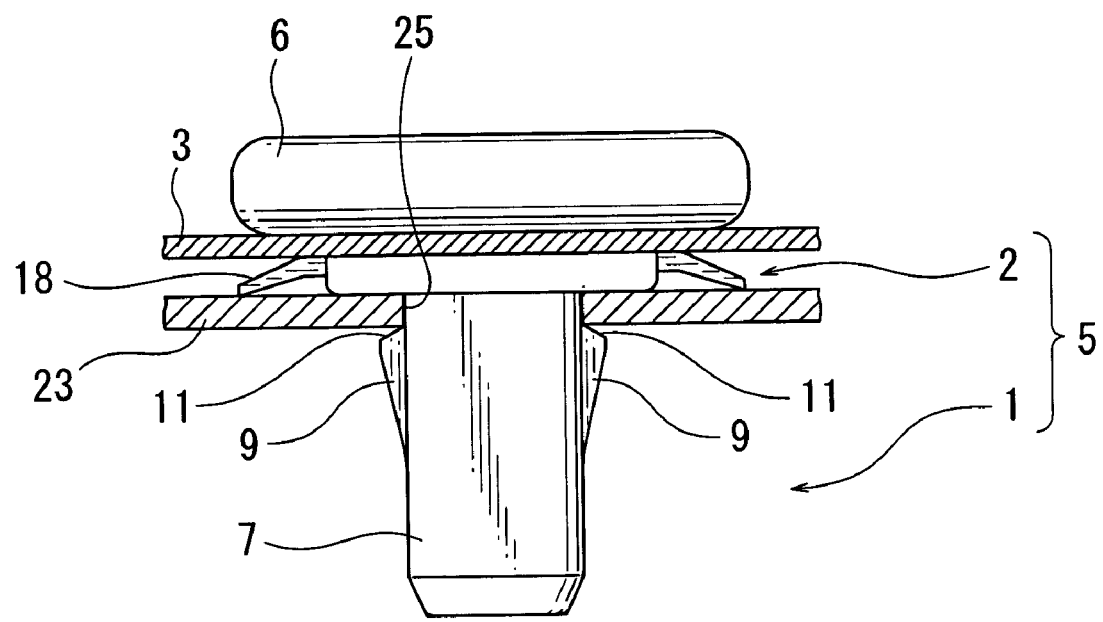
FIG. 8 is a front view of the fastener device in the first example of the present invention showing the first component connected to a second component.
Figure 9:
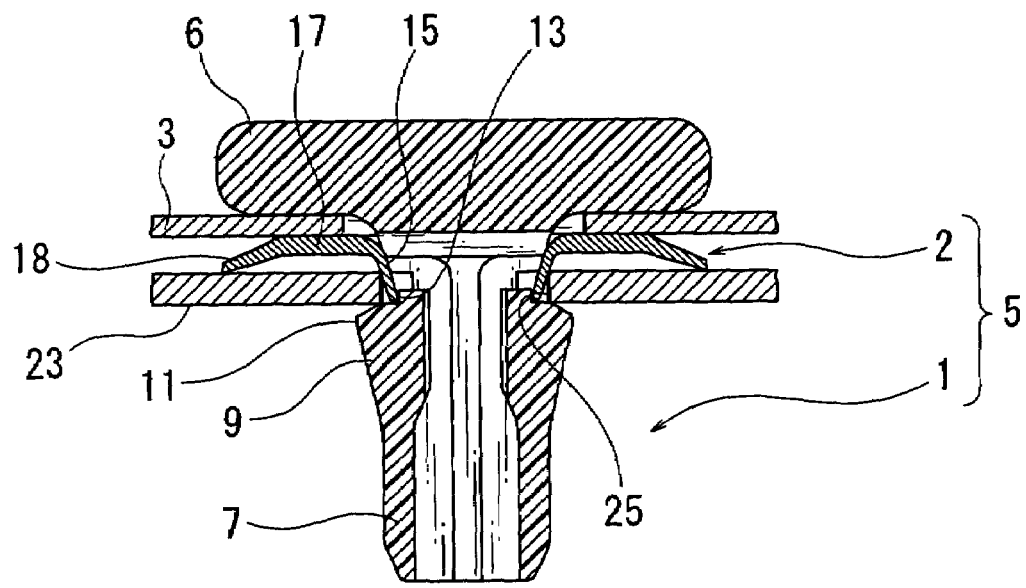
FIG. 9 is a cross-sectional view of the fastener device when fastened as shown in FIG. 8.

As shown in FIG. 8, the fastener device 5 holding the first component 3 is placed in position with respect to a second component 23 and then fastened to the second component 23. The fastening operation is performed by simply inserting the shank 7 of the clip 1 into a mounting hole 25 in the second component 23. The first elastic engagement leaves 9 on the shank 7 bend inward inside the mounting hole 25 and then pass out of the mounting hole 25. The shoulders 11 then engage the edge of the mounting hole 25, and the clip 1 is fastened to the second component. FIG. 9 is a cross-sectional view after the fastening operation. Because the flat surface portion 17 of the retaining plate 2 and the flange 6 are within a predetermined interval at this time, the tips of the second elastic engagement leaves 15 engage the engagement receiving portions 13 at the tips of the first elastic engagement leaves 9, but the first elastic engagement leaves 9 do not move inward with respect to the shank 7. As shown in FIG. 8 and FIG. 9, the fastener device 5 comprising the clip 1 and the retaining plate 2 fasten the first component 3 to the second component 23.

Figure 10:
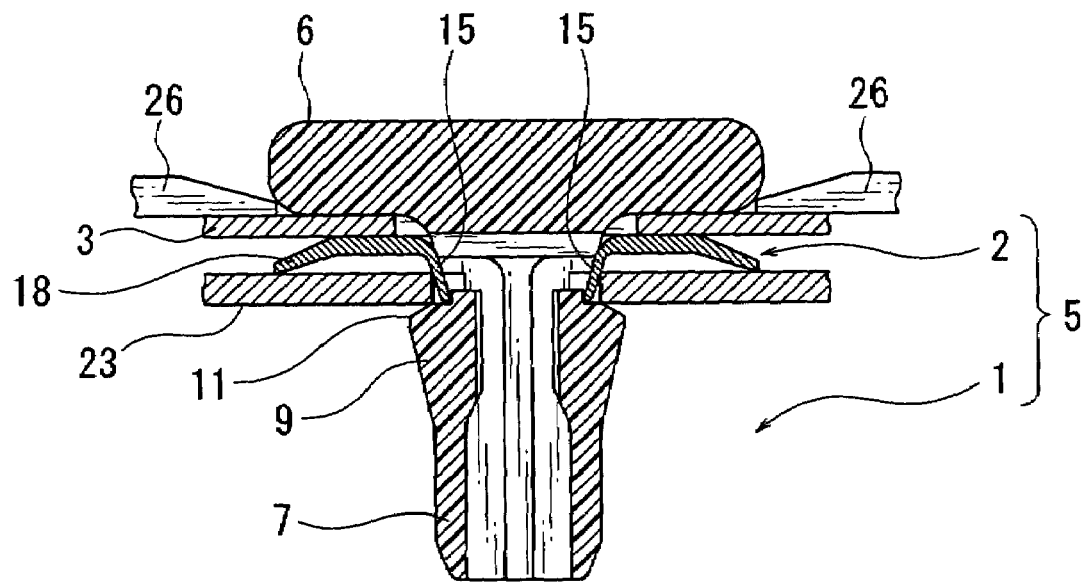
FIG. 10 is a cross-sectional view of the fastener device showing a release operation for the fastener device in FIG. 9.
Figure 11:
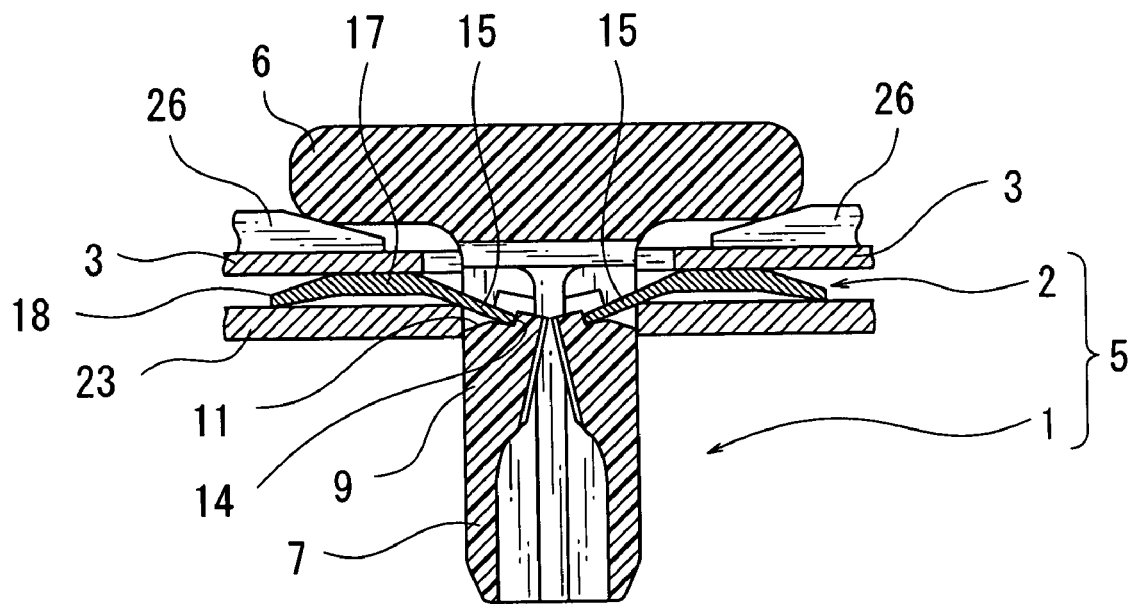
FIG. 11 is a cross-sectional view of the fastener device showing the release operation continuing from FIG. 10.
Figure 12:
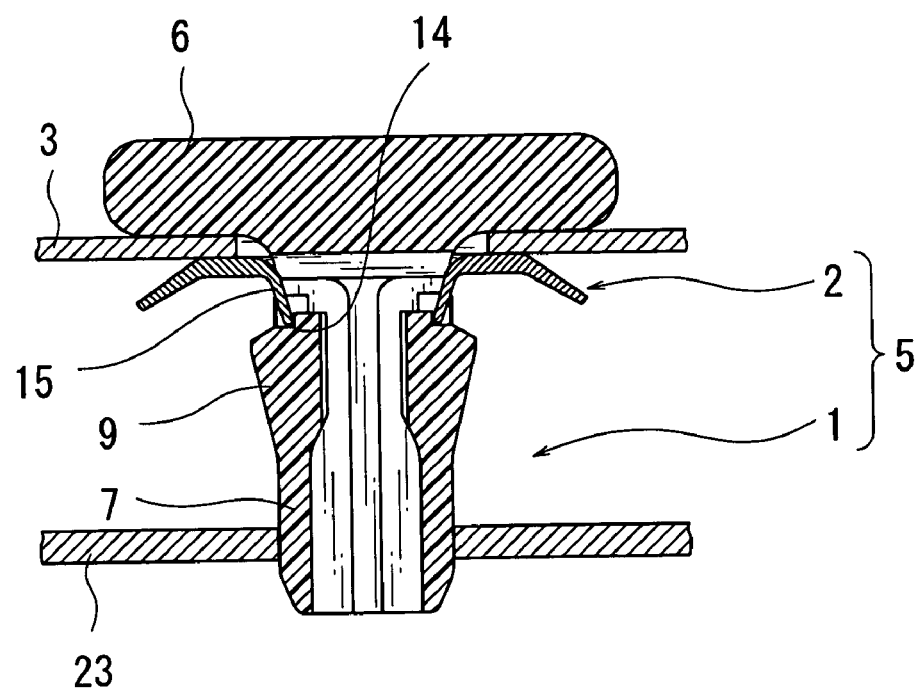
FIG. 12 is a cross-sectional view of the fastener device showing the release operation continuing from FIG. 11, in which the device has been detached from the second component.

The following is an explanation with respect to FIG. 10 through FIG. 12 of an operation performed to detach the first component 3 from the second component 23. In FIG. 10, the tip of a tool 26 such as a screwdriver or longnose pliers is inserted between the flange 6 on the clip 1 and the first component 3. When the tip of the tool 26 is inserted further, as shown in FIG. 11, the interval between the flange 6 and the first component 3 widens, and the external force begins to move the retaining plate 2 away from the flange 6. When the external force flattens the third elastic engagement leaves 18, the second elastic engagement leaves 15 become almost horizontal. Because the tips of the second elastic engagement leaves 15 are engaged with the engagement receiving portions 13 of the first elastic engagement leaves 9 on the shank 7, the first elastic engagement leaves 9 are pushed inward. This causes the shoulders 11 on the first elastic engagement leaves 9 to disengage from the edge of the mounting hole in the second component 23. If the tool 26 is then pulled upward, the fastener device 5 comprising the clip 1 and the retaining plate 2 can be pulled out from the second component 23 while still holding the first component 3 as shown in FIG. 12. The bottom portion of the edge of the flange 6 preferably tapers to form a space between the flange and the first component 3 so that the tool 26 can be more easily inserted between the flange 6 and the first component 3.

As described above, the first component 3 can be removed from the second component 23 by simply inserting the tip of a tool 26 between the flange 6 and the first component 3. When the tip of the tool 26 is inserted between the flange 6 and the first component 3 and force is applied inward radially, force is also applied to the clip 1 in the pull-out direction from the second component 23. Therefore, by simply inserting the tip of a tool 26 between the flange 6 and the first component 3 and applying force inward radially, the first component 3 held by the clip 1 and the retaining plate 2 begins to become unfastened from the second component 23. It can then be removed from the second component 23 by applying a little pull-up force. Because the pull-up force applied is so slight, the clip is not broken; the second component is not deformed or damaged; and the fastener device 5 can be reused.

FIG. 13 through FIG. 16 show a fastener device 5A in a second example of the present invention. In this fastener device 5A, a bore 27 is formed in both the flange 6A and shank 7A of the clip 1A. Also, the fastener device 5A includes a pin 31 having a pin flange 29 and pin shank 30 in addition to the clip 1A and the retaining plate 2. Inserting the pin 31 into the bore 27 keeps the engagement leaves 9 from bending inward. The pin 31 is configured so that it can be removed from the clip 1A.

The pin 31 is preferably an integrally molded component. A first circumferential groove 33 is formed at the tip of the pin shank 30 and a second circumferential groove 34 is formed in the middle. An elastic engagement portion 35 is formed inside the bore 27, near the border between the flange 6A and the shank 7A, in order to engage the circumferential grooves 33, 34. When the pin shank 30 is inserted into the bore 27 and the elastic engagement portion 35 engages the first circumferential groove 33, the pin 31 has been inserted to a midway temporary rest position. In the temporary rest position the pin 31 is held against loss. When the pin shank 30 cannot be inserted any further into the shank 7A, and the elastic engagement portion 35 engages the second circumferential groove 34, the pin 31 has been inserted fully, and the pin 31 is fastened to the clip 1

Figure 14:
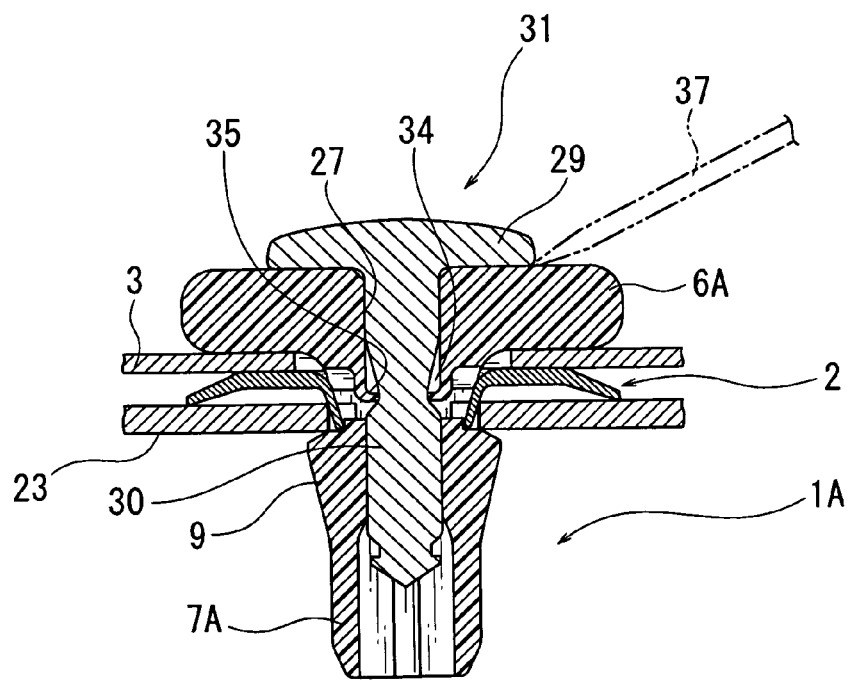
FIG. 14 is a cross-sectional view of the fastener device in FIG. 13 in which the pin has been pushed into the clip.
Figure 15:
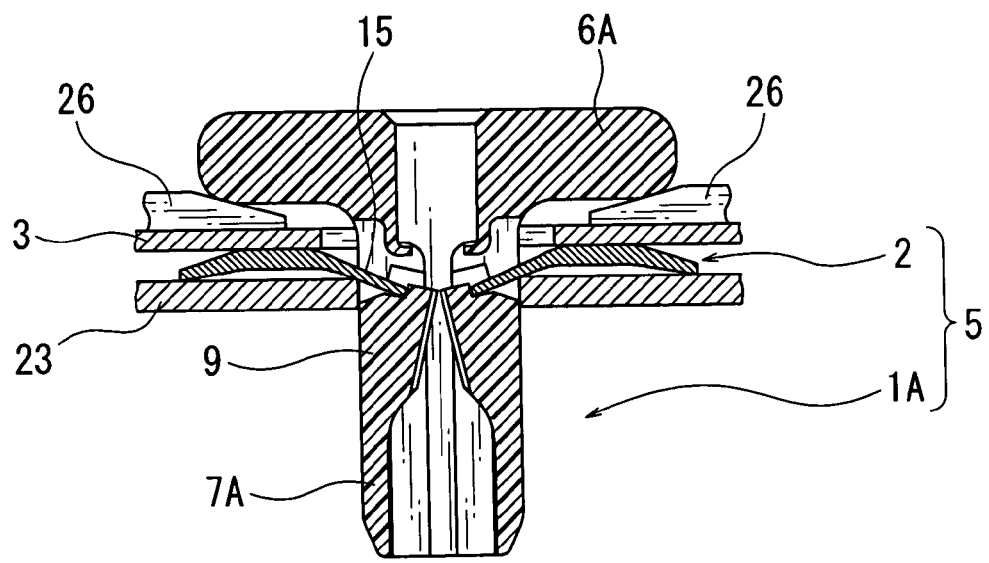
FIG. 15 is a cross-sectional view of the fastener device showing a release operation for the fastener device in FIG. 14.
Figure 16:
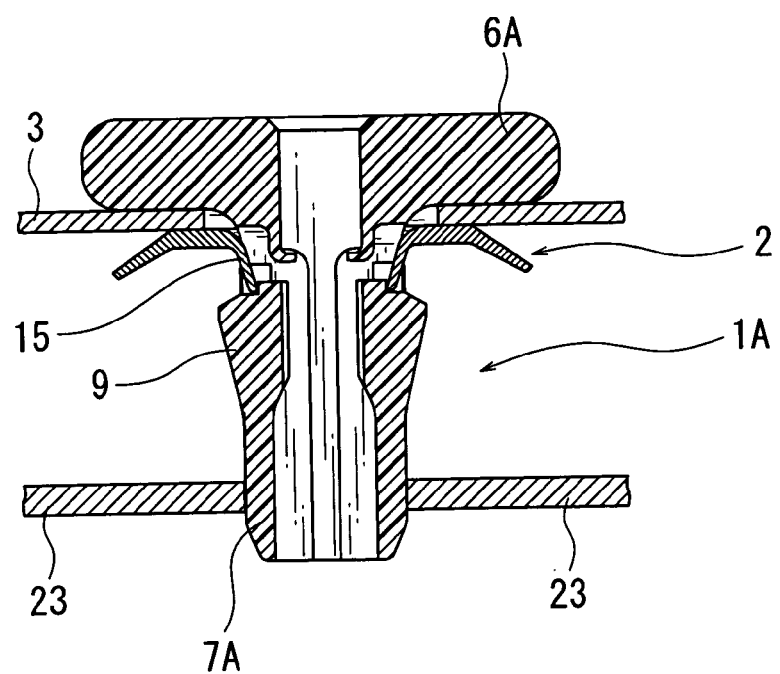
FIG. 16 is a cross-sectional view of the fastener device showing the release operation continuing from FIG. 15, in which the device has been detached from the second component.

In the position shown in FIG. 14, the first component 3 is fastened to the second component 23, and the pin 31 is inserted completely into the clip 1A. In this position, the first elastic engagement leaves 9 cannot bend inward with respect to the shank 7A. In this position, if a strong force is applied tending to separate the first component 3 from the second component 23, the first elastic engagement leaves 9 strongly engage the second component 23, and the components cannot be disengaged from one another. If, for example, the first component is an attachment tab for a curtain shield airbag and the second component is a car body, deployment of the airbag as a result of a collision exerts strong pull-out force on the first component, but it is prevented from becoming detached from the second component.

Figure 13:
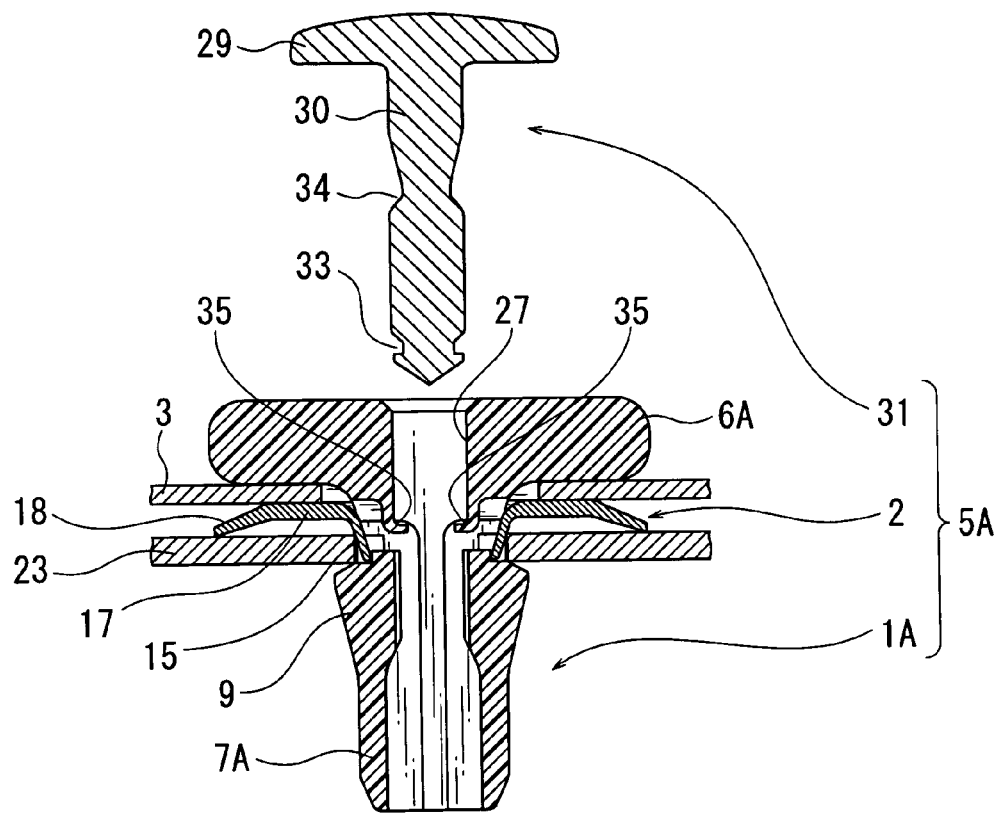
FIG. 13 is a cross-sectional view of a second example of the present invention showing a pin about to be pushed into the clip.

If mounted improperly, the first component 3 has to be detached from the second component 23. If fastener device 5A is used, the pin 31 is first removed from the clip 1A. As indicated by the dotted lines in FIG. 14, the tip of a tool 37 such as a screwdriver is inserted between the pin flange 29 and the clip flange 6A, and the pin is pulled out, as shown in FIG. 13. After the pin 31 has been pulled out, the same procedure in FIG. 10 through FIG. 12 is performed in FIG. 15 and FIG. 16 to remove the first component 3 held by clip 1A and retaining plate 2 from the second component 23. In other words, a tool 26 is inserted between the flange 6A and the first component 3. The second elastic engagement leaves 15 move the first elastic engagement leaves 9 inward with respect to the shank 7A and disengage them from the edge of the mounting hole in the second component 23. A little force is then applied to remove the first component 3 held by the clip 1A and the retaining plate 2 from the second component 23.

While preferred embodiments of the invention have been shown and described, changes can be made without departing from the principles and spirit of the invention, the scope of which is defined in the following claims.

What is claimed is:

1. A fastener device for connecting a first component to a second component, comprising:
    a clip having a flange and a hollow shaft depending therefrom, wherein the shaft has first elastic engagement leaves projecting outwardly from sides of the shaft and moveable inwardly and outwardly of the shaft; and
    a retaining plate having a hole for passing the shaft of the clip, wherein the retaining plate has second elastic engagement leaves disposed to engage portions of the first elastic engagement leaves, and wherein the retaining plate is constructed to cooperate with the flange of the clip to interpose the first component between the flange and the retaining plate when the shaft of the clip is passed through a hole in the first component, and
    wherein the first elastic engagement leaves have shoulders constructed to engage an edge of a hole in the second component when the shaft of the clip is passed through the hole in the second component, so that the retaining plate is interposed between the first and second components.

2. The fastener device of claim 1, wherein the retaining plate has third elastic engagement leaves extending outwardly therefrom and constructed to engage the second component.

3. The fastener device of claim 2, wherein the third elastic engagement leaves are constructed to collapse in response to an external force moving the flange away from the first component and moving the first component toward the second component, and wherein the second elastic engagement leaves are constructed to thereupon move the first elastic engagement leaves inwardly of the shaft to release the shoulders from the second component so that the clip can be withdrawn from the second component.

4. The fastener device of claim 1, further comprising a pin, and wherein the flange and the shaft have a bore into which the pin is inserted to block inward movement of the first elastic engagement leaves.

5. The fastener device of claim 4, wherein the pin has a shaft with a pair of longitudinally spaced grooves, and the clip has elements extending into the bore to engage the grooves, one of which engages the elements to hold the pin partially inserted in the bore and the other of which engages the elements to hold the pin fully inserted in the bore.

* * * * *